(12) United States Patent
Ceccarelli, III et al.

(10) Patent No.: US 7,815,201 B2
(45) Date of Patent: Oct. 19, 2010

(54) DOLLY ASSEMBLY

(75) Inventors: Charles J. Ceccarelli, III, Mountain Home, ID (US); Kevin B Haight, Royal Oak, MI (US)

(73) Assignee: Inventive LLC, Mountain Home, ID (US)

( * ) Notice: Subject to any disclaimer, the term of this patent is extended or adjusted under 35 U.S.C. 154(b) by 314 days.

(21) Appl. No.: 12/061,884

(22) Filed: Apr. 3, 2008

(65) Prior Publication Data

US 2009/0250890 A1 Oct. 8, 2009

(51) Int. Cl.
*B62B 1/00* (2006.01)
(52) U.S. Cl. .................. 280/79.4; 280/43.21; 414/428
(58) Field of Classification Search .............. 280/79.11, 280/79.4, 79.5, 79.6, 47.34, 43.21; 414/428, 414/429, 427
See application file for complete search history.

(56) References Cited

U.S. PATENT DOCUMENTS

| 1,275,716 | A | * | 8/1918 | Maurer, Jr. .................. 414/429 |
| 2,380,415 | A | * | 7/1945 | Carruthers ................... 414/429 |
| 4,690,605 | A | | 9/1987 | Coccaro |
| 4,692,082 | A | * | 9/1987 | Smith .......................... 414/429 |
| 4,854,803 | A | | 8/1989 | Coccaro |
| 5,505,578 | A | * | 4/1996 | Fuller .......................... 414/427 |
| 5,941,675 | A | | 8/1999 | Orr |
| 6,789,994 | B2 | * | 9/2004 | Tortellier ..................... 414/429 |
| 7,097,406 | B1 | * | 8/2006 | Gang ........................... 414/429 |
| 7,232,138 | B2 | * | 6/2007 | Shubert ....................... 280/79.4 |
| 7,275,753 | B1 | | 10/2007 | Ceccarelli et al. |
| 7,597,524 | B2 | * | 10/2009 | Hernandez ................... 414/428 |

OTHER PUBLICATIONS

The Speed Dolly Operations Manual; In the Ditch Towing Products; www.InTheDitch.com.
The Speed Dolly; Speed Dolly Brochure; http://www.intheditch.com/speeddollyL3.htm.
Zendex Tool Corporation, American Tool Builders; GoJak; 2007 Zendex Tool Corporation; http://www.zendextool.com/gojak/How-GoJak-Works.html.
Rack and pinion; From Wikipedia, the free encyclopedia; http://en.wikipedia.org/wiki/Rack_and_pinion.
Ratchet (device); From Wikipedia, the free encyclopedia; http://en.wikipedia.org/wiki/Ratchet_%28device%29.

* cited by examiner

*Primary Examiner*—Hau V Phan
(74) *Attorney, Agent, or Firm*—Michael P. Mazza, LLC

(57) ABSTRACT

A dolly assembly for use in towing a disabled vehicle, preferably including a main tube with a dolly wheel mounted at each end, and a method of using same. In one preferred embodiment, the main tube is capable of selective expansion or contraction along its longitudinal axis, to facilitate adjustment and placement of dolly axle assemblies connecting opposed, generally parallel dolly assemblies. Force leveraging mechanisms may be used to aid the selective expansion or contraction of the main tube, such as ratchet or rack and pinion mechanisms. In an alternative embodiment, and for ease in transport, the dolly assembly may be pivotably collapsed along its main tube about either a vertical or horizontal axis.

6 Claims, 17 Drawing Sheets

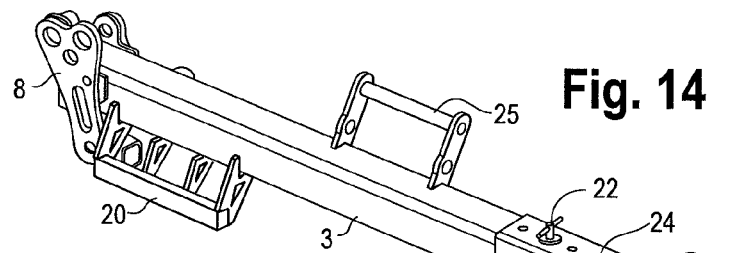
Fig. 14
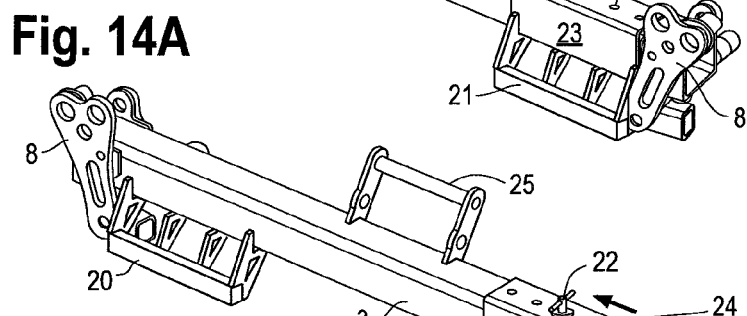
Fig. 14A
Fig. 14B
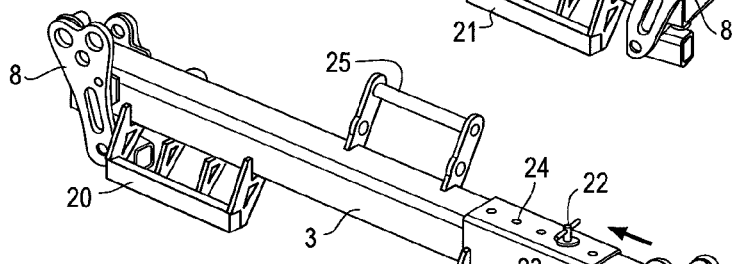
Fig. 14C
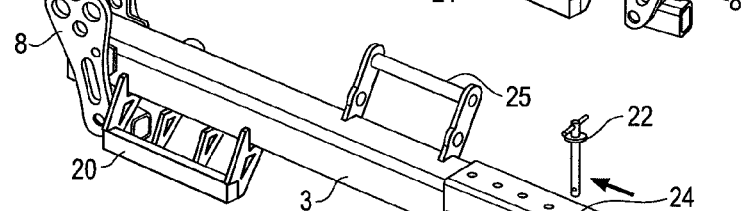
Fig. 14D
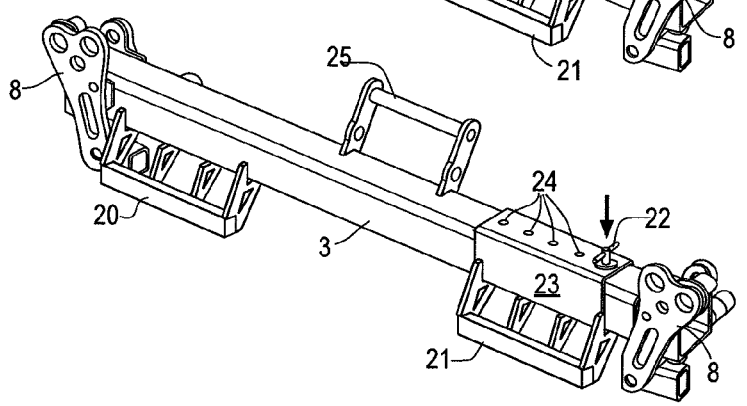

DOLLY ASSEMBLY

RELATED PATENTS

U.S. Pat. No. 7,275,753 filed Apr. 28, 2006 and titled "Towing Dolly Cradle Assembly" is hereby incorporated by reference in its entirety into this disclosure.

BACKGROUND OF THE INVENTION

The present invention generally relates to a towing dolly cradle assembly useful in the recovery of disabled vehicles by a tow truck. More specifically, the invention is directed to the individual dolly wheel assemblies that make up that cradle assembly.

Various towing dolly cradle assemblies are known, as shown in U.S. Pat. No. 7,275,753 to Ceccarelli ("the '753 patent"), U.S. Pat. No. 5,941,675 to Orr, and U.S. Pat. No. 4,690,605 to Coccaro ("the '605 patent"). Preferably, a towing dolly cradle assembly includes a pair of parallel, opposed dolly wheel assemblies interconnected by a pair of interposed dolly axle assemblies, to form a rectangular frame. Each dolly wheel assembly includes two dolly wheels mounted outboard of a main tube, and an inboard-mounted axle cradle. The axle cradle is designed to carry one end of a dolly axle assembly. The disabled vehicle wheels may be raised in various ways. With the '753 patent, pivot mounting assemblies attached to the main tube and to the dolly wheels enable the dolly axle assemblies, supporting the disabled vehicle wheels, to be raised. With the '605 patent, the individual wheels of a disabled vehicle are raised using an individual, dedicated dolly wheel assembly whose chocks or body section members are drawn together. These towing dolly cradle assemblies permit one end of the disabled vehicle to be raised and transported behind a towing vehicle.

Most towing dolly assemblies require substantial strength from the tower to situate the cradle around the wheels of the disabled vehicle to be raised, and to raise the disabled vehicle wheels. It would be advantageous to provide a towing dolly assembly whose wheel cradle is more easily manipulated.

With towing dolly assemblies, placement of the cradle assembly around the wheel of a disabled vehicle is limited. For this reason, it would be advantageous to create a towing dolly assembly having movable axle cradles.

Further, dolly assemblies are rather large and cumbersome to store on towing vehicles with limited space. It would be advantageous to have a towing dolly cradle assembly that can collapse when it is not in use for ease of storing, transporting, and carrying by a user.

SUMMARY OF THE INVENTION

The objects mentioned above, as well as other objects are solved by the present invention, which overcomes disadvantages of prior towing dolly assemblies, while providing new advantages not believed associated with such assemblies.

In one preferred embodiment, a dolly assembly for use in towing a disabled vehicle is provided, and may include a main tube having a dolly wheel mounted at each end. The main tube may be capable of selective expansion or contraction along its longitudinal axis, to facilitate adjustment and placement of dolly axle assemblies connecting opposed, generally parallel dolly assemblies. Force leveraging mechanisms, such as ratchet or rack and pinion mechanisms, may be used to aid in the selective expansion or contraction of the main tube.

A stop mechanism, which may be pivotably mounted to the force leveraging mechanism for example, may be used for fixing the main tube in a desired position. The stop mechanism may be designed to drop into an aperture on the main tube to fix the main tube in the desired position.

In an alternative, preferred embodiment, a dolly assembly with a main tube and a dolly wheel mounted at each end may also include one or more cradles mounted on the main tube. The one or more cradles may be adapted to attach to an axle assembly connecting two opposing dolly assemblies, and the cradles may be capable of selective sliding movement along the main tube. If two pivot mounting assemblies are located at opposing locations on the main tube, each pivot mounting assembly being pivotably mounted to a dolly wheel, the slidable cradles may be located on the main tube and between the pivot mounting assemblies.

For ease of transport, the main tube of a dolly assembly may be capable of collapsing by pivoting about either vertical or horizontal axes normal to the longitudinal axis of the main tube. These axes preferably pass through an approximate midpoint location along the main tube.

A method of using a dolly assembly in towing a disabled vehicle also forms a part of the present invention. A dolly assembly with a main tube and opposing dolly wheels mounted at each end may be located adjacent the longitudinal edge of a disabled vehicle. The length of the main tube may be adjusted by selectively expanding or contracting its length along its longitudinal axis. Main tube length adjustment may be accomplished using a force leveraging mechanism such as a ratchet mechanism or a rack and pinion mechanism.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Dolly assembly" means a mechanism with one or more wheels for raising a disabled vehicle wheel for towing purposes.

"Ratchet mechanism" means a device including a bar or wheel having inclined teeth into which a pawl drops so that motion can be imparted to the bar or wheel, to allow effective motion in one direction.

"Rack and pinion mechanism" means a device including a pair of gears which convert rotational motion into linear motion. For example, the circular pinion engages teeth on a flat bar, or rack.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIGS. 14-14D are a top and side perspective view of the inner side of a main bar of a dolly wheel assembly;

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
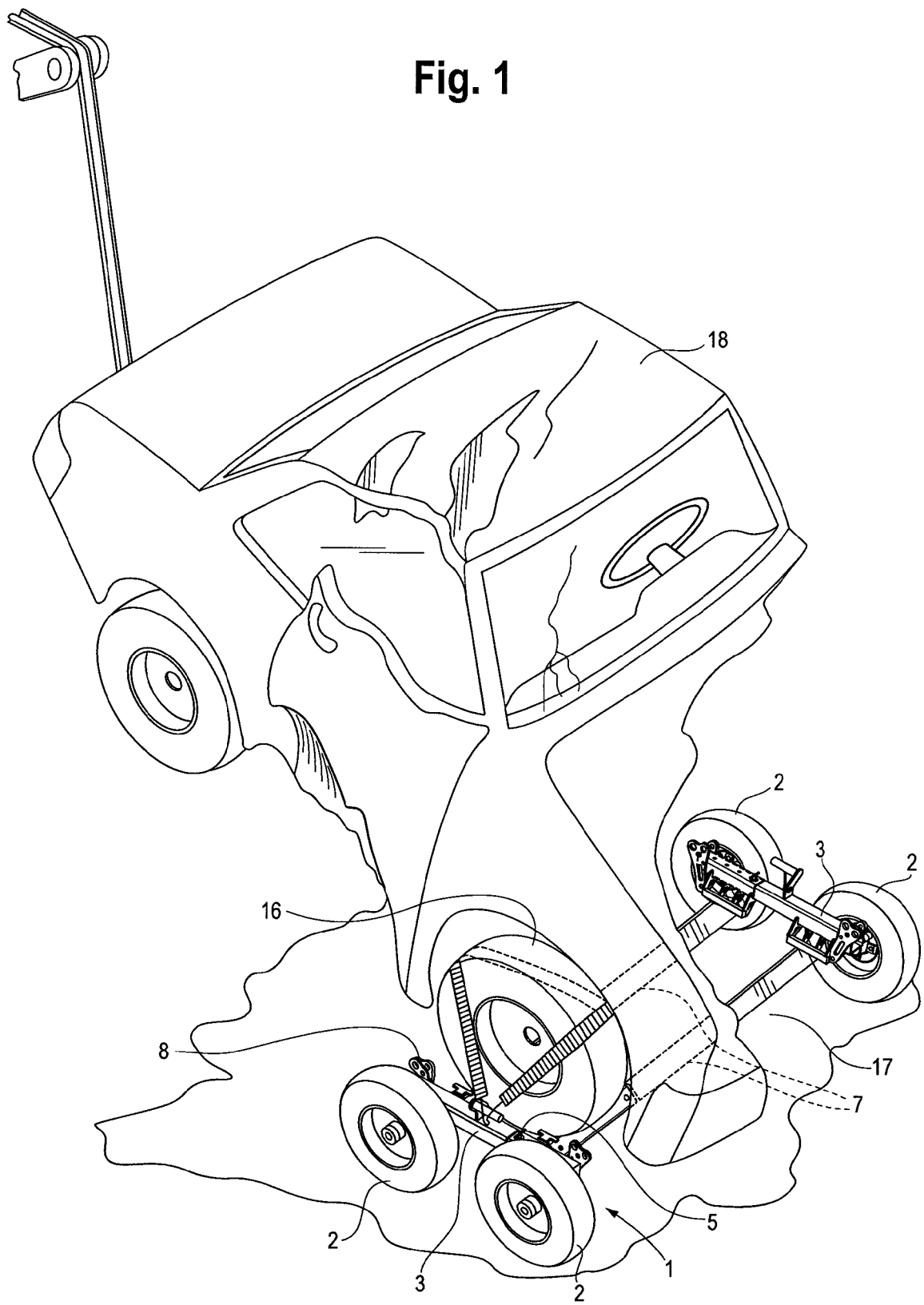
FIG. 1 is a top and side perspective view of a towing dolly cradle assembly carrying the right wheel of a disabled vehicle.
Figure 2:
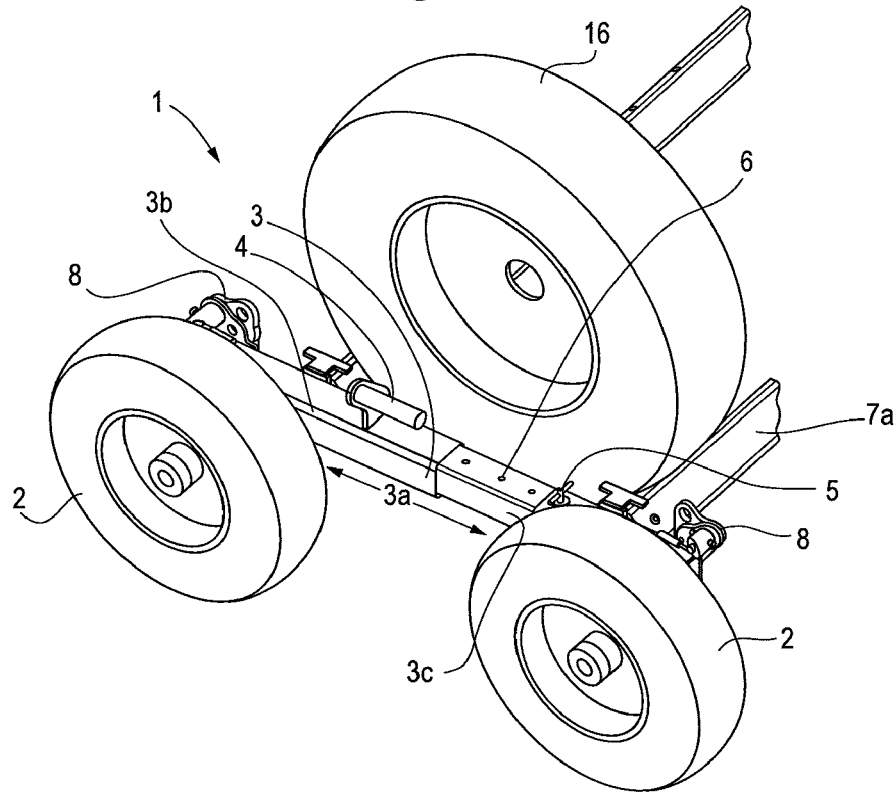
FIGS. 2 and 2A are a top and side perspective view of the outer side of a dolly wheel assembly carrying the wheel of a disabled vehicle.
Figure 3:
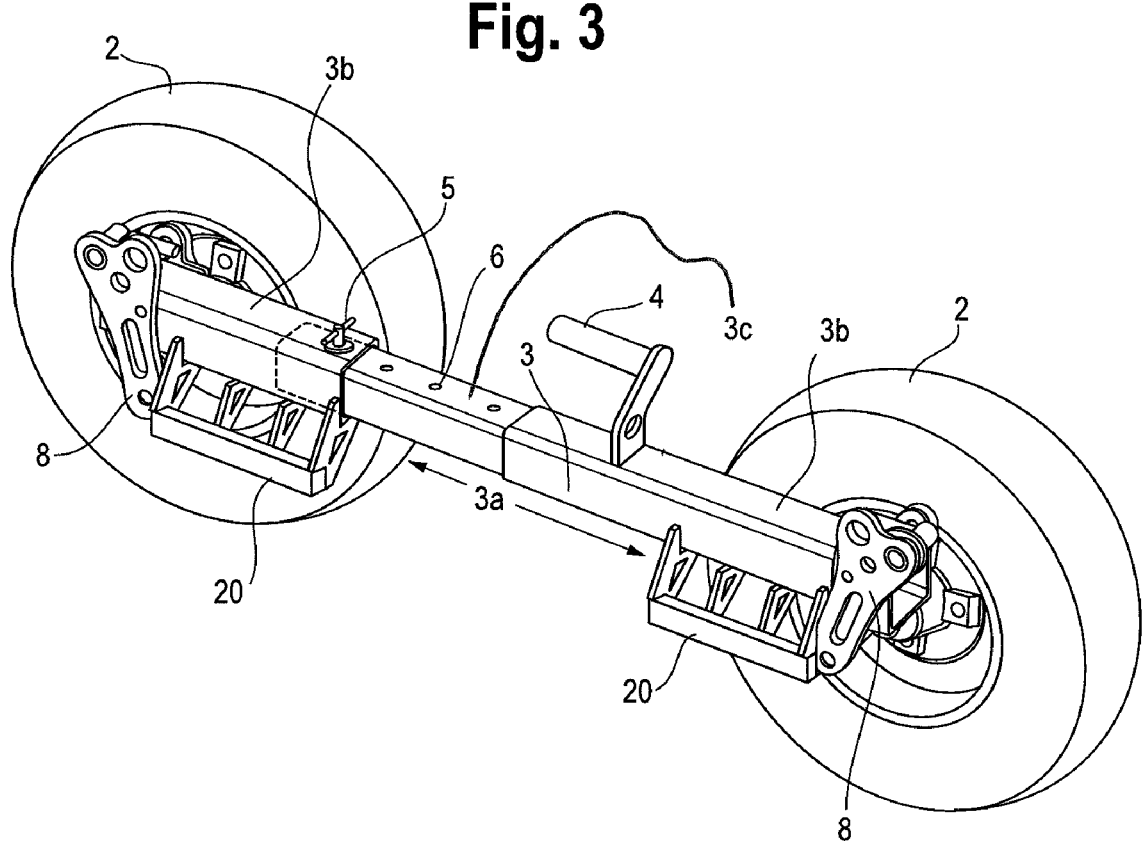
FIGS. 3 and 3A are a top and side perspective view of the inner side of a dolly wheel assembly.
Figure 3A:
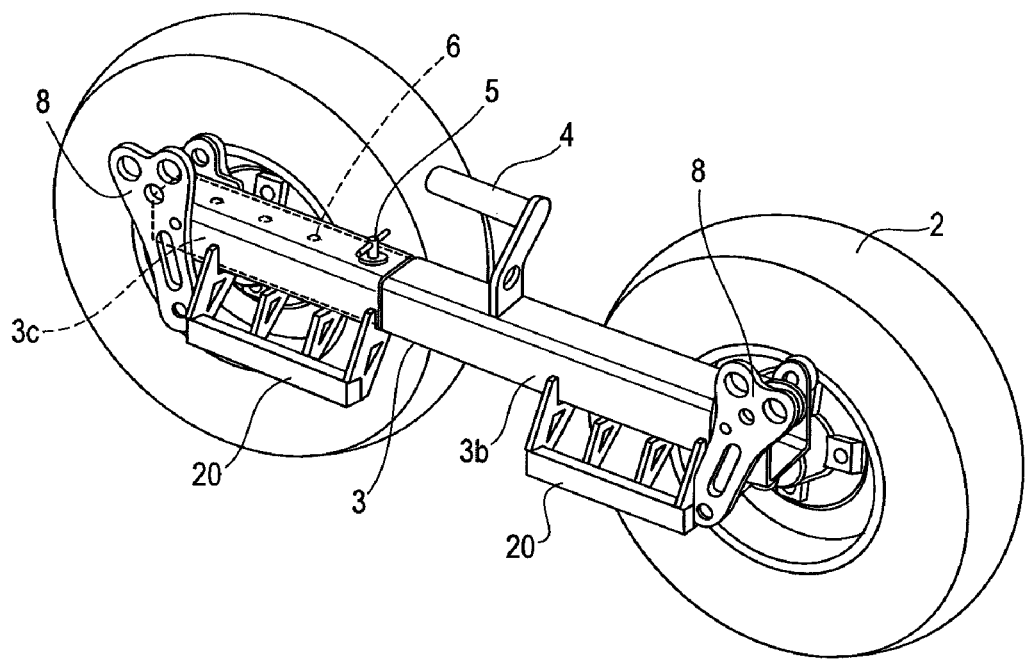
Figure 4:
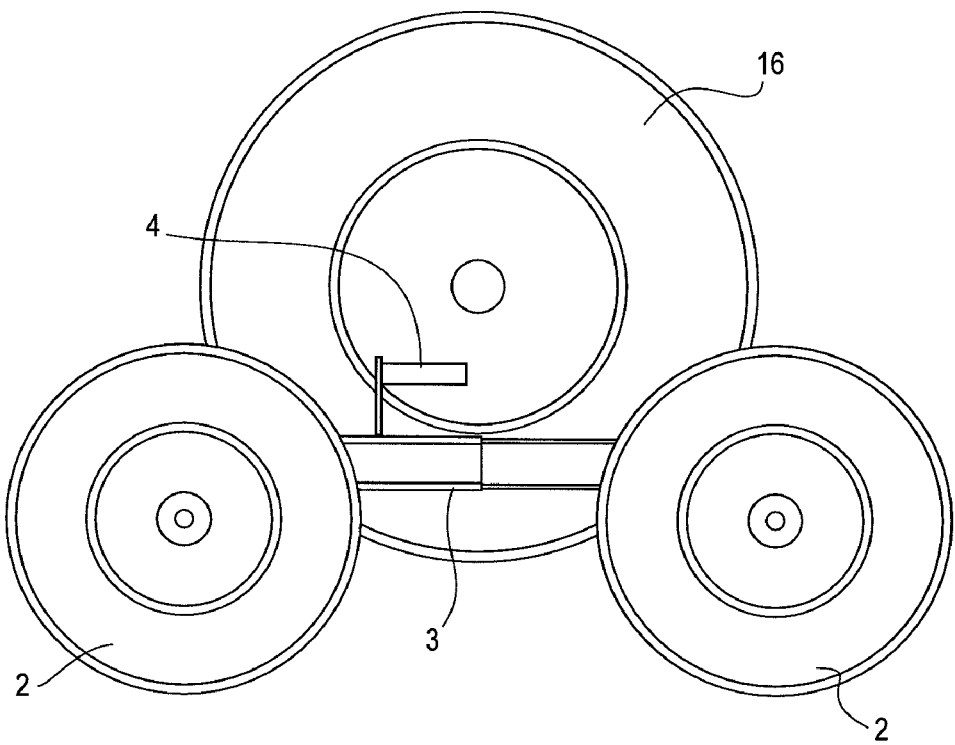
FIG. 4 is a front perspective view of the outer side of a dolly wheel assembly carrying the wheel of a disabled vehicle.
Figure 4A:
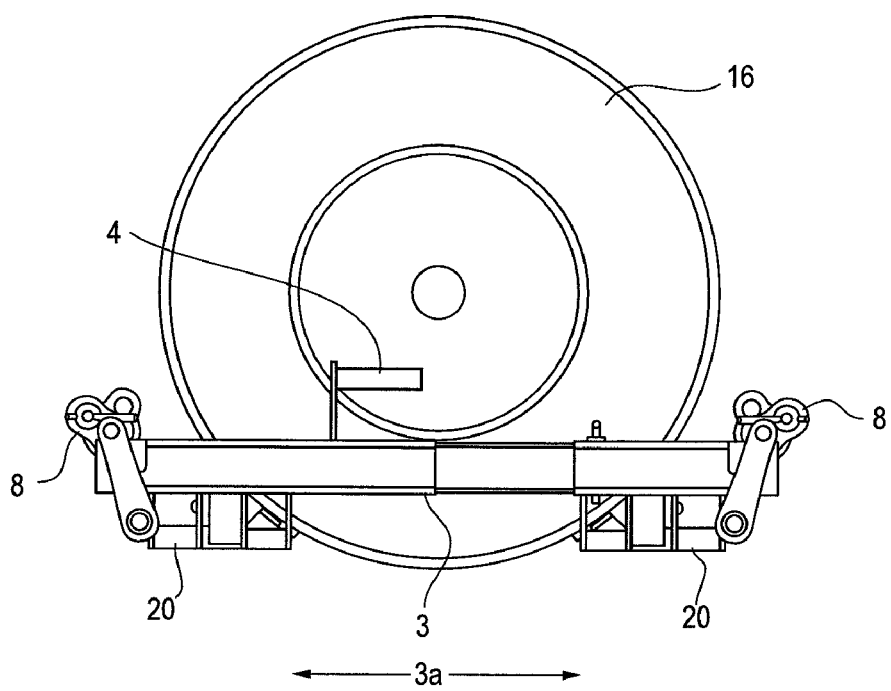
FIG. 4A is the same view as FIG. 4 except that dolly wheels have been removed.
Figure 9:
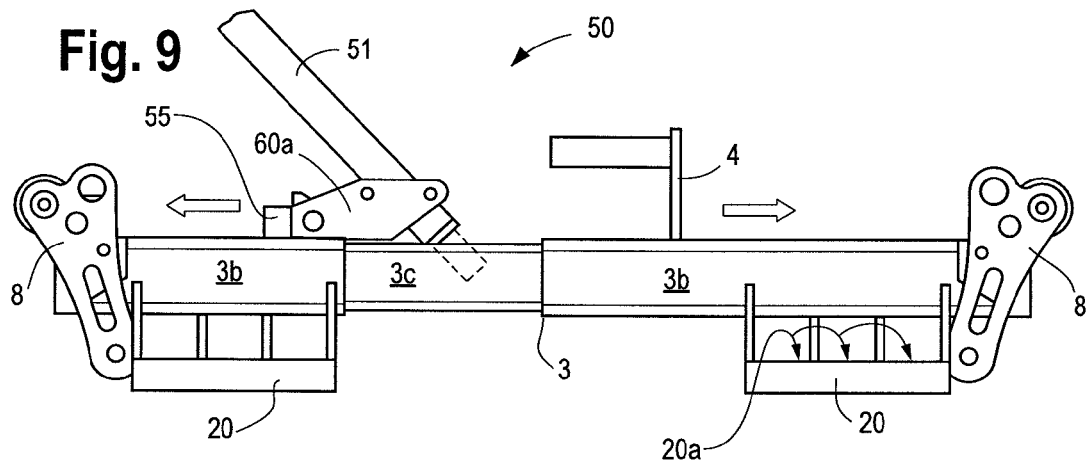
FIGS. 9 and 9A are a front perspective view of the inner side of the main bar of a dolly wheel assembly.
Figure 9A:
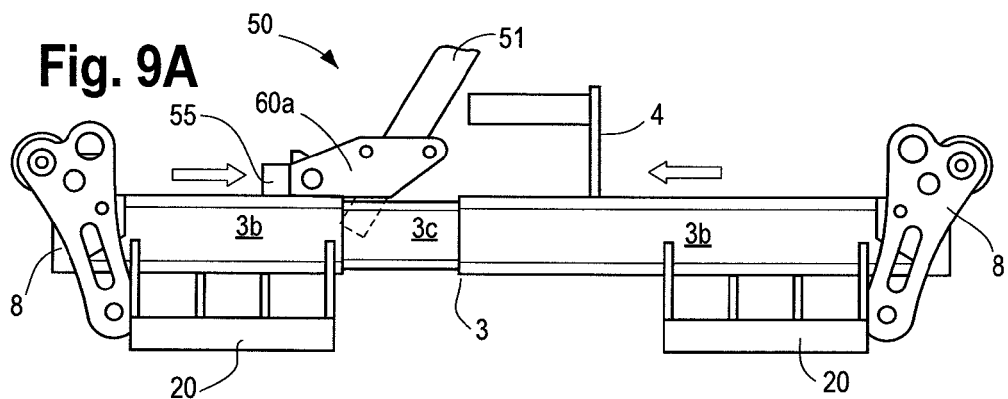

Referring first to FIG. 1, a preferred embodiment of a towing dolly assembly 1 is shown in the towing of disabled vehicle 18. A towing dolly cradle assembly 17 may include two towing dolly assemblies 1 that are spaced parallel and apart and reversibly joined together by two interposed dolly axle assemblies 7. Each towing dolly assembly may include a horizontal main tube 3 for engaging dolly wheels 2, as explained in detail in U.S. Pat. No. 7,275,753. Cradles 20 (FIG. 3) accept and carry the ends of dolly axle assemblies 7 in one of the cradle pockets 20a(see FIG. 9). Cross axles 7a (FIG. 2) may be placed around disabled vehicle wheel 16.

Figure 11:
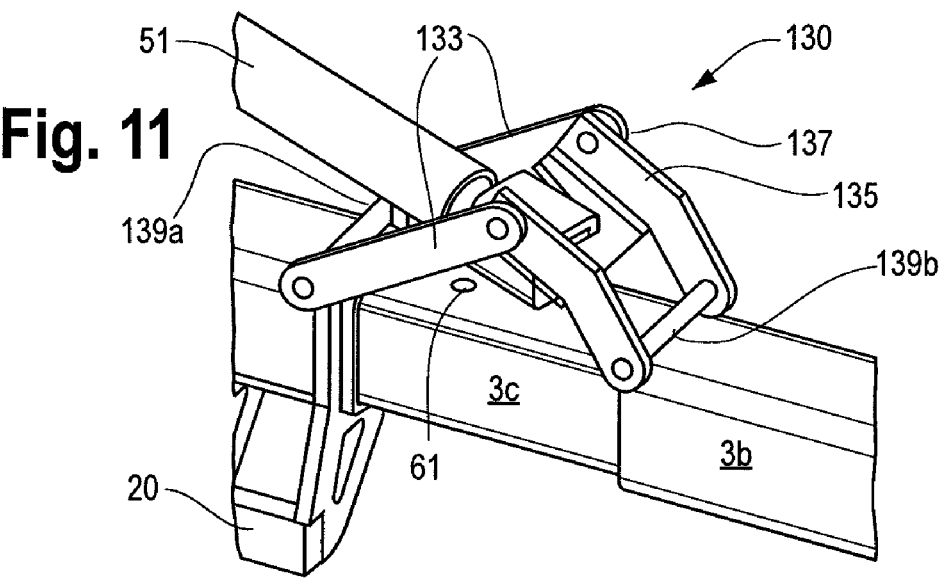
FIGS. 11-11B are an enlarged top and side perspective view of the center portion of the inner side of the main bar of a dolly wheel assembly.
Figure 11A:
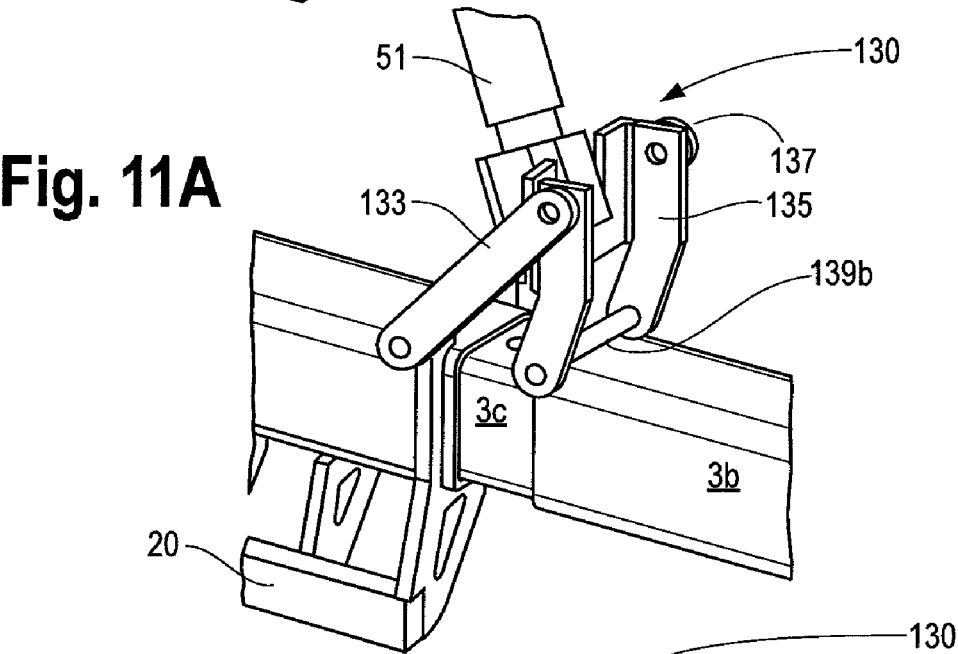

Referring to FIGS. 11 and 14 of the '753 patent, basic steps in the operation of the preferred towing dolly assembly of the present invention, as generally disclosed in the '753 patent, are now described for background purposes. First, dolly assemblies 1 may be placed on either side of the disable vehicle. Next, cross axles 7a may be extended so that one is fore and is aft of the disabled vehicle wheel. While the dolly is in the stowed position, such that the dolly wheel spindle or pivot mounting is above the main frame of the dolly, and the axle cradles are on the ground, the ends of the cross axles may be placed into the cradles of the dolly frames. The cross axles are preferably placed as close to the disabled vehicle wheel as possible. A breakover bar may now be located in the receiver tube that is welded onto each dolly spindle, providing the leverage to walk or rotate the breakover bar around, enabling the dolly wheel to be rolled under the dolly frame, allowing one side of the device to lift into the air. This process may be repeated three more times for each wheel in the set. In the loaded position, the spindle will be under the main frame which provides the lift to the axles. When the towing dolly assembly 1 is loaded using pivot mounting assembly 8 (as explained in U.S. Pat. No. 7,275,753), disabled wheel 16 is raised on cross-axles 7a.

Figure 2A:
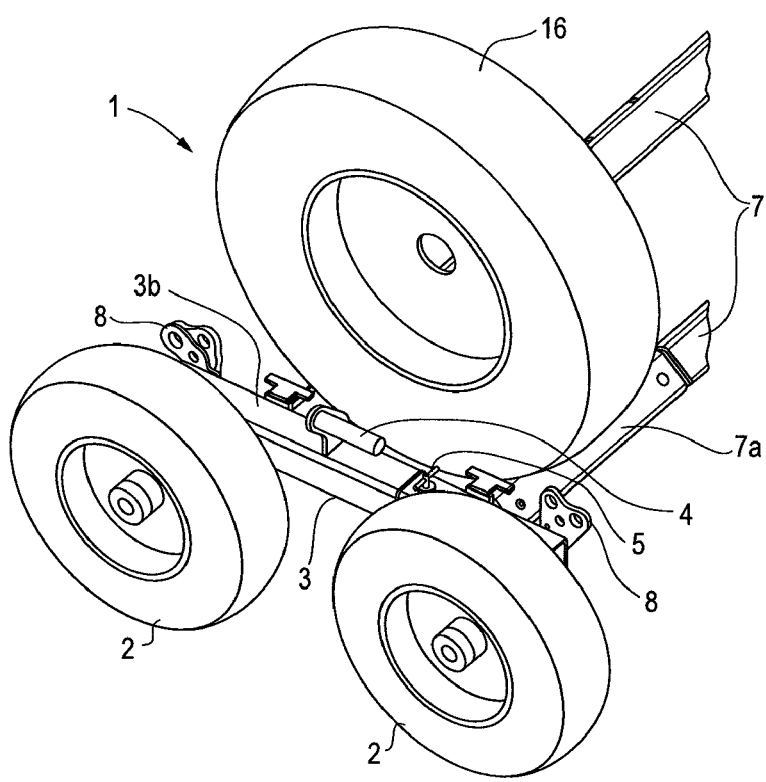
Figure 5:
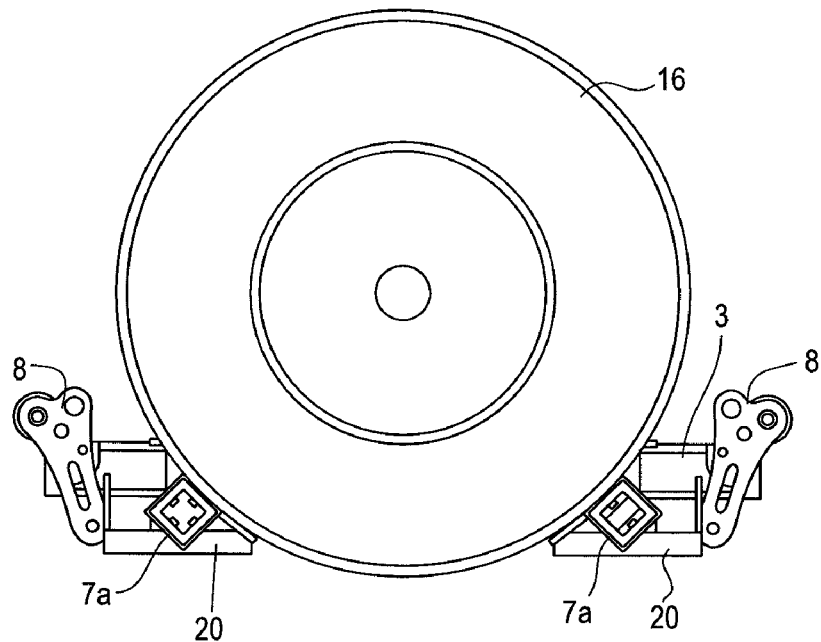
FIGS. 5 and 5A are a front perspective view of the inner side of the dolly wheel assembly in FIG. 4A.
Figure 5A:
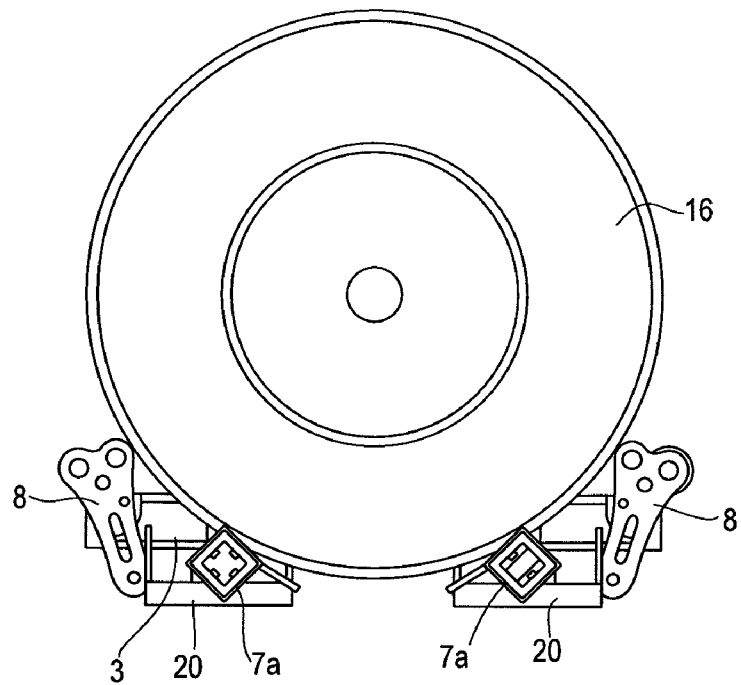
Figure 6:
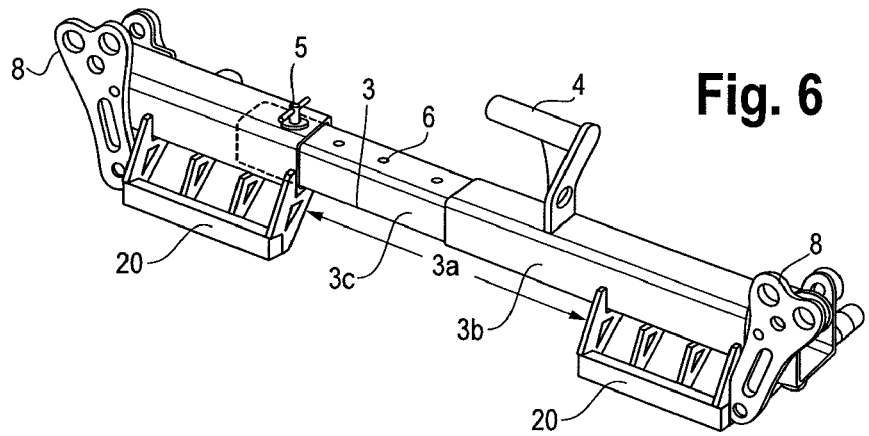
FIGS. 6 and 6A are a top and side perspective view of the inner side of the main bar of a dolly wheel assembly.
Figure 6A:
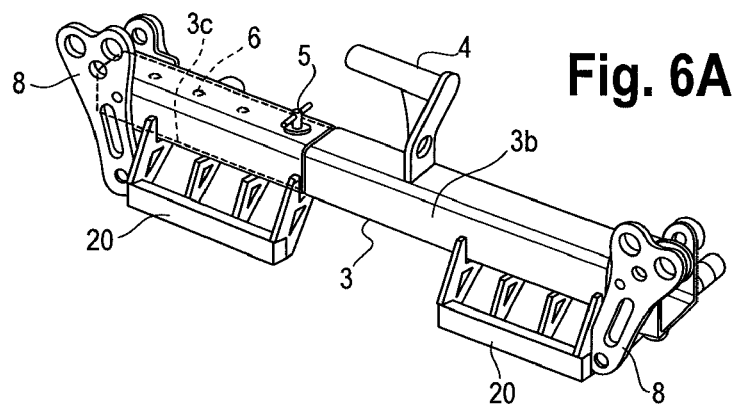
Figure 6B:
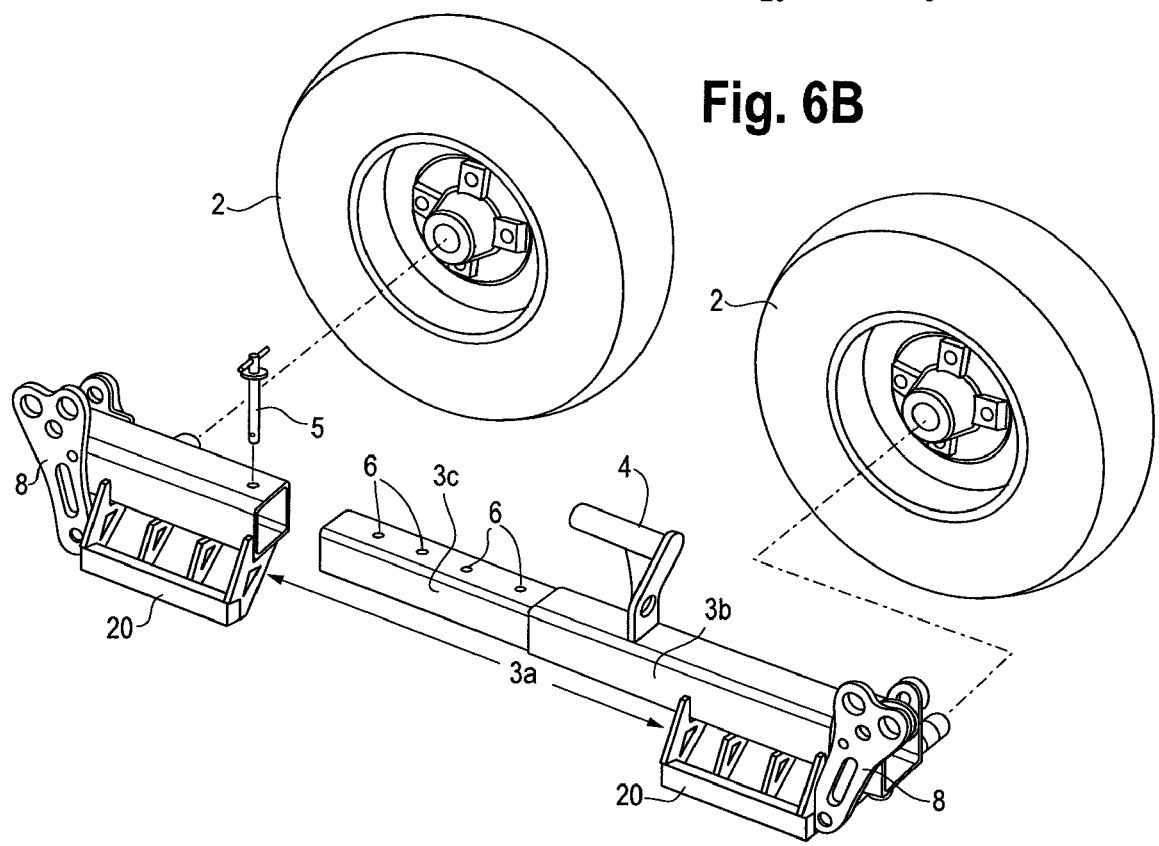
FIG. 6B is a top and side perspective view of the inner side of a dolly wheel assembly.
Figure 7:
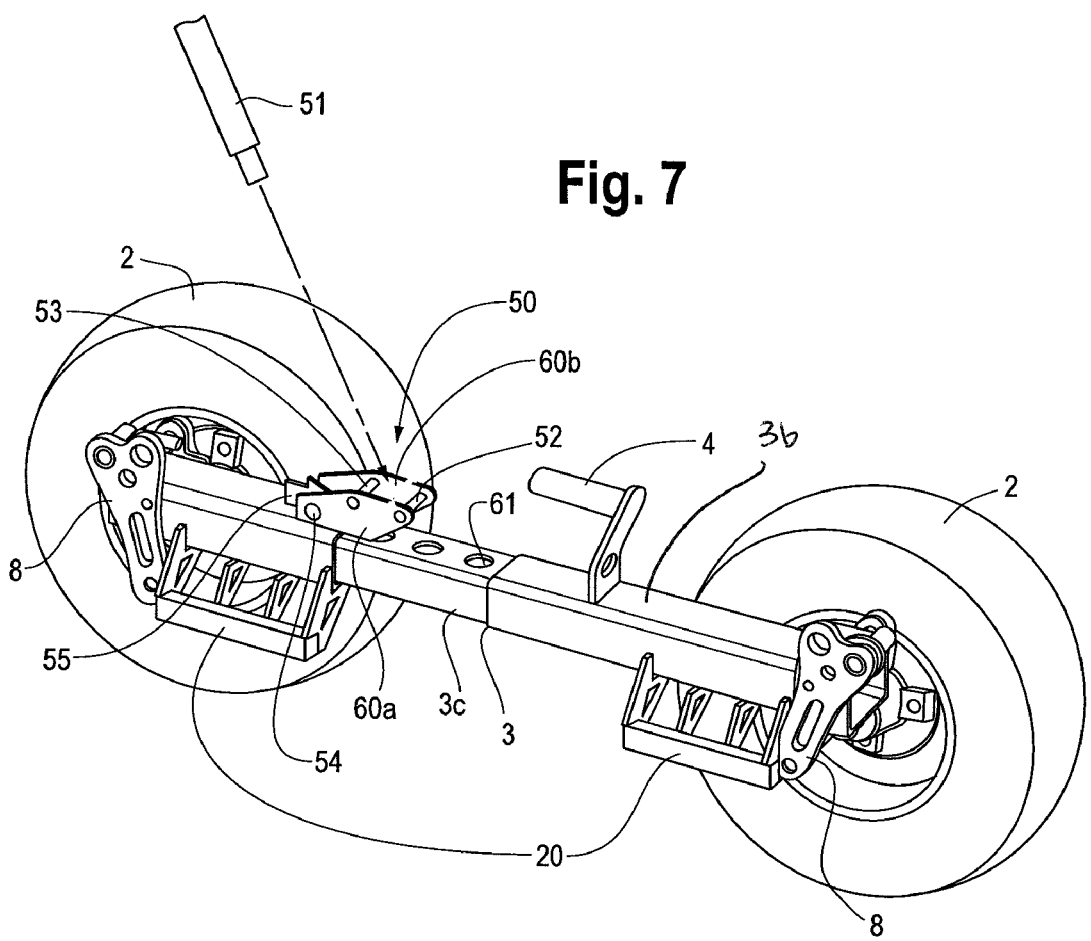
FIGS. 7 and 7A are a top and side perspective view of the inner side of a dolly wheel assembly.
Figure 7A:
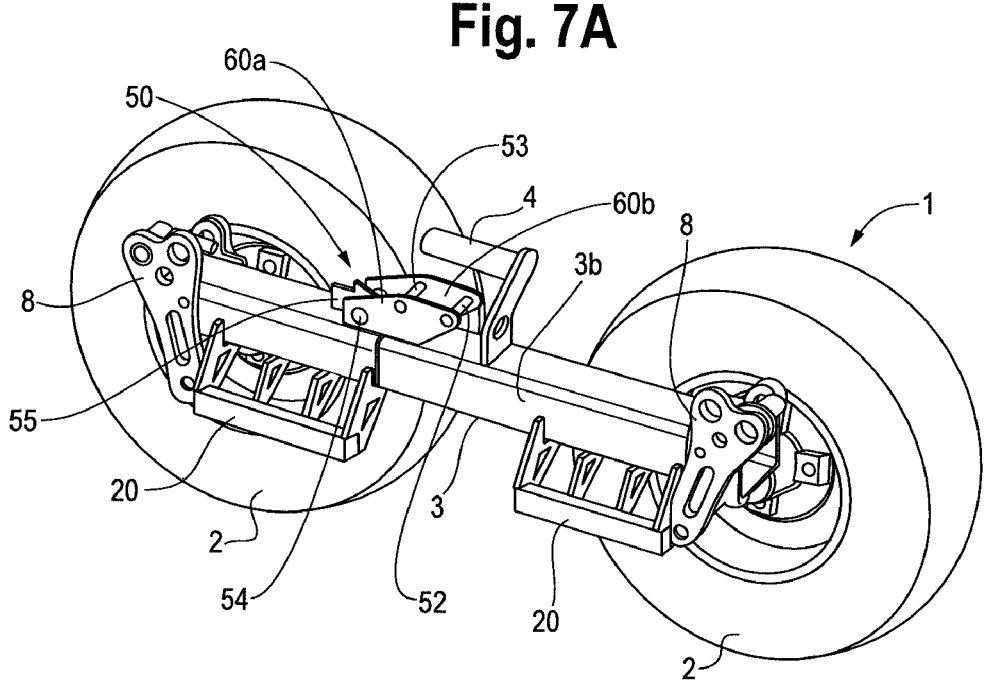
Figure 8:
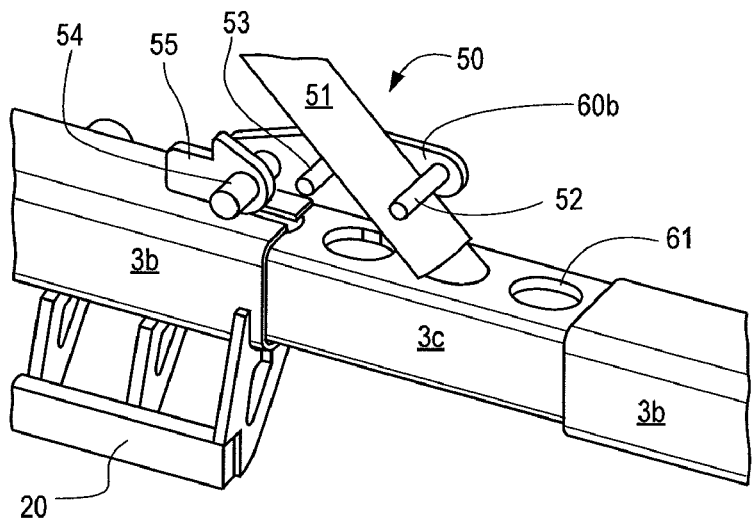
FIGS. 8-8B are an enlarged top and side perspective view of the center portion of the inner side of the main bar of a dolly wheel assembly.
Figure 8A:
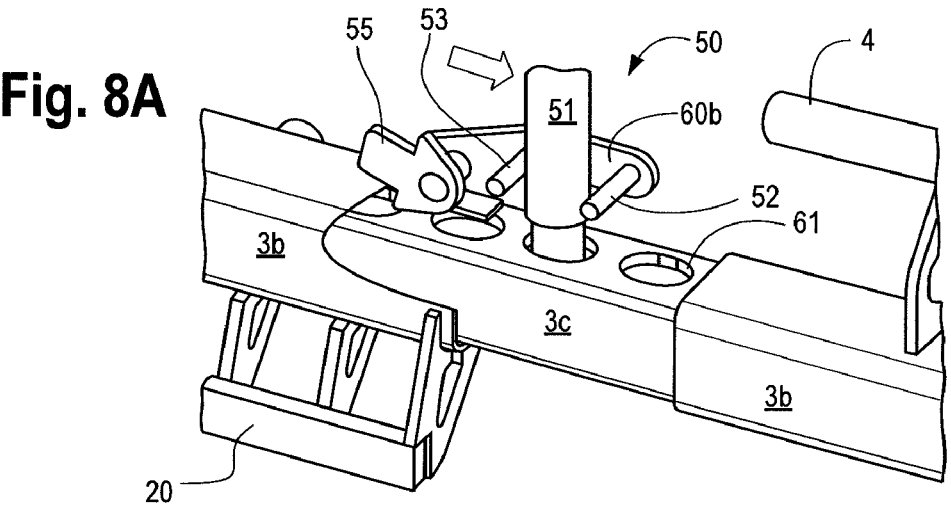
Figure 8B:
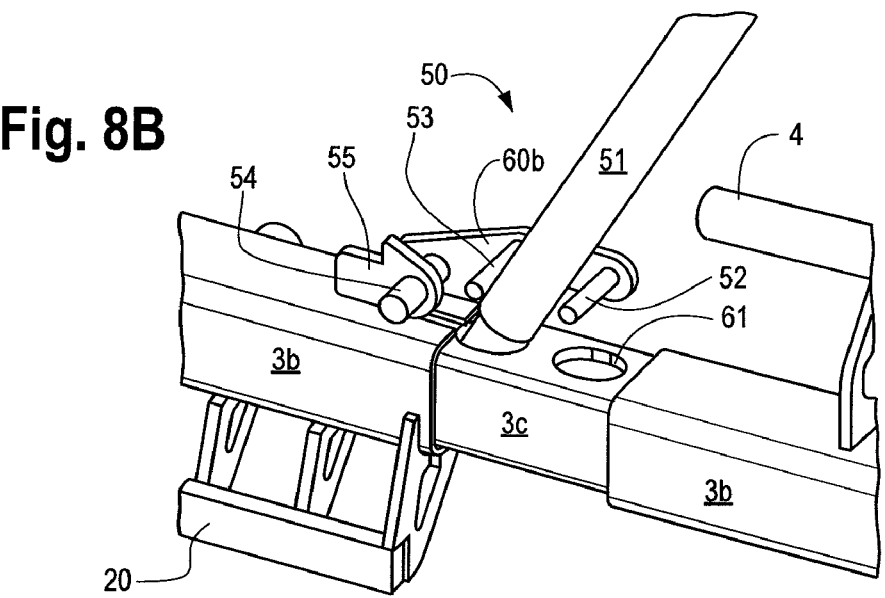

Referring now to FIGS. 1-6B, main tube 3 of towing dolly assembly 1 may expand or contract along its longitudinal axis 3a. The varying space between cross-axles 7a allows a user to more easily position the towing dolly assembly around disabled vehicle wheel 16. This allows wheel 16 of a disabled vehicle (see FIGS. 1-2A) to be raised higher on cross-axles 7a (FIGS. 5-5A). Main tube 3 may be a telescoping tube in which outer main tube 3b slides over inner main tube 3c.

Referring to FIGS. 1-4A and 6-11B, main tube 3 of towing dolly assembly 1 may expand or contract by a variety of means. Referring now to FIGS. 2-3A and 6-6B, main tube 3 may include pin holes 6 spaced at different distances along inner main tube 3c to accommodate (e.g.) spring-loaded pin 5. A handle 4 may be provided to enable the user to transport assembly 1, or to more easily manipulate the tube. When a user wants to contract or expand main tube 3, user removes pin 5, slides outer main tube 3b along longitudinal axis 3a using handle 4, and reinserts pin 5 in one of holes 6 that provides user with the desired length of main tube 3, thereby locking main tube 3 at its desired position.

Referring now to FIGS. 7-10A, a ratchet mechanism 50 for main tube 3 of towing dolly assembly 1 is shown. Ratchet 50 with lever 51 is implemented in this embodiment to assist the user by providing extra force for expanding or contracting main tube 3, moving outer main bar 3b over inner main bar 3c. Ratchet 50 may include side walls 60a and 60b. Pins 52 and 53 may be used to connect side walls 60a and 60b while providing support for lever 51.

Figure 9B:
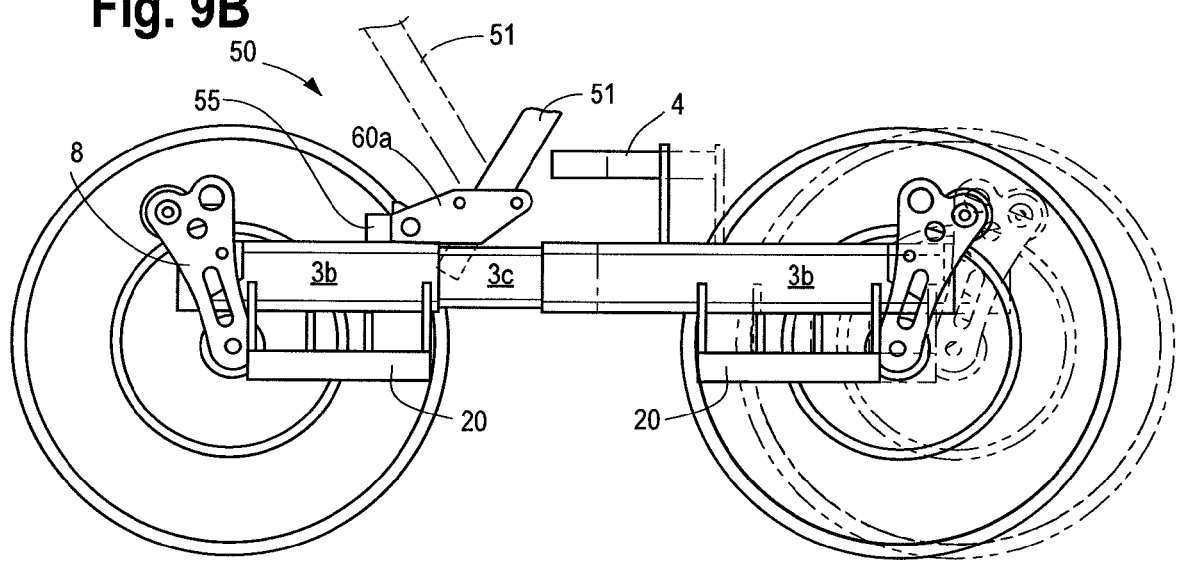
FIG. 9B is a front perspective view of the inner side of a dolly wheel assembly.
Figure 10:
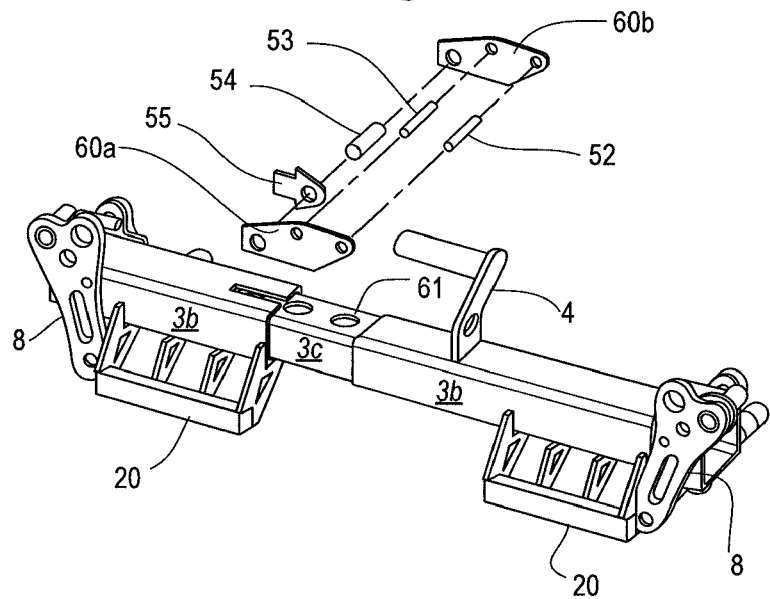
FIG. 10 and is a top and side perspective view of the inner side of the main bar of a dolly wheel assembly.
Figure 10A:
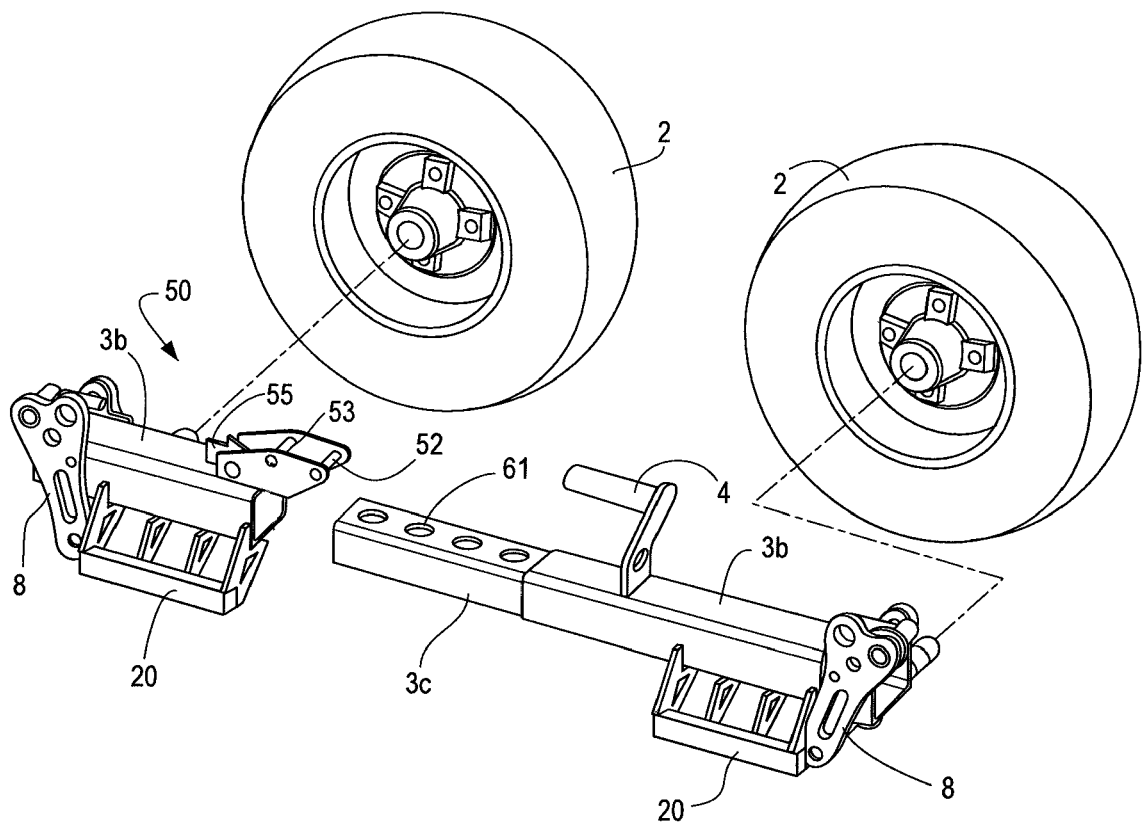
FIG. 10A is a top and side perspective view of the inner side of a dolly wheel assembly.

In the operation of the preferred embodiment, as ratchet lever 51 is rotated from left to right (FIG. 9B), ratchet 50 moves left to right causing main bar portion 3b to move left to right. At the end of lever 51's rotation, the end of weighted stop 55, which rotates around pin 54, will be permitted to drop in the hole 61 of the main tube preceding the hole in which lever 51 resides, locking the main tube portions in place. Further rotation of ratchet lever 51 will cause this process to repeat (i.e. stop 55 will release from its hole 61, main bar portion 3b will again advance left to right, etc.

Figure 11B:
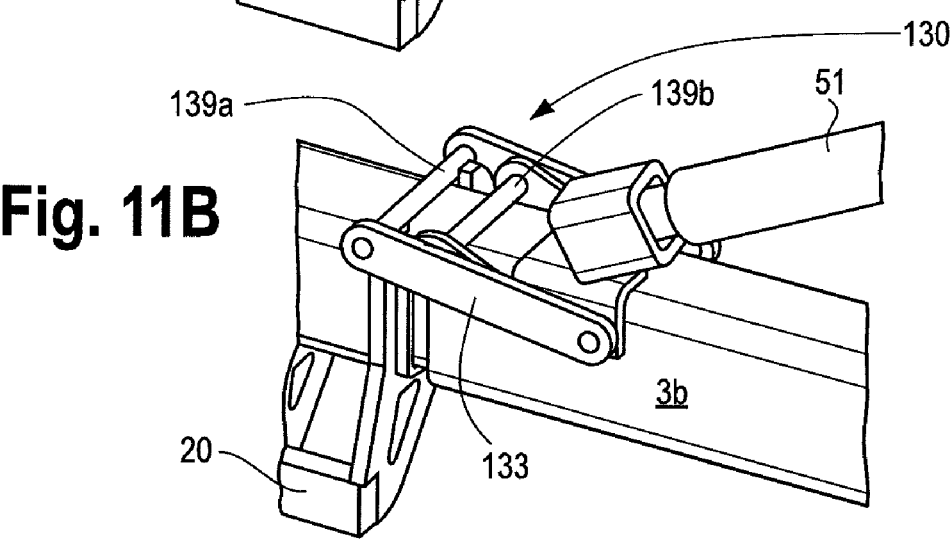

Referring now to FIGS. 11-11B, an alternative ratchet mechanism 130 is shown which includes outer plates 133 and inner plates 135 pivotally connected to each other at pin 137 and to the main tube at pins 139a, 139b. As ratchet lever 51 is rotated left to right, ratchet 130 progressively moves from the position shown in FIG. 11, then to 11A, and finally to the locked, overcenter position shown in FIG. 11B.

Figure 12:
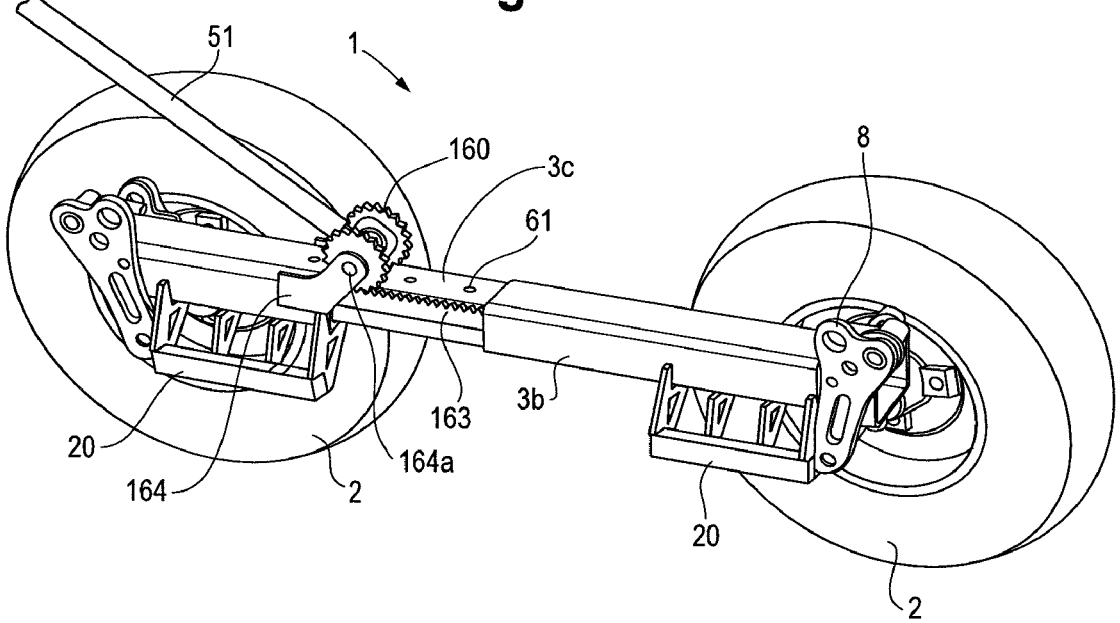
FIGS. 12-12A are a top and side perspective of the inner side of a dolly wheel assembly.
Figure 12A:
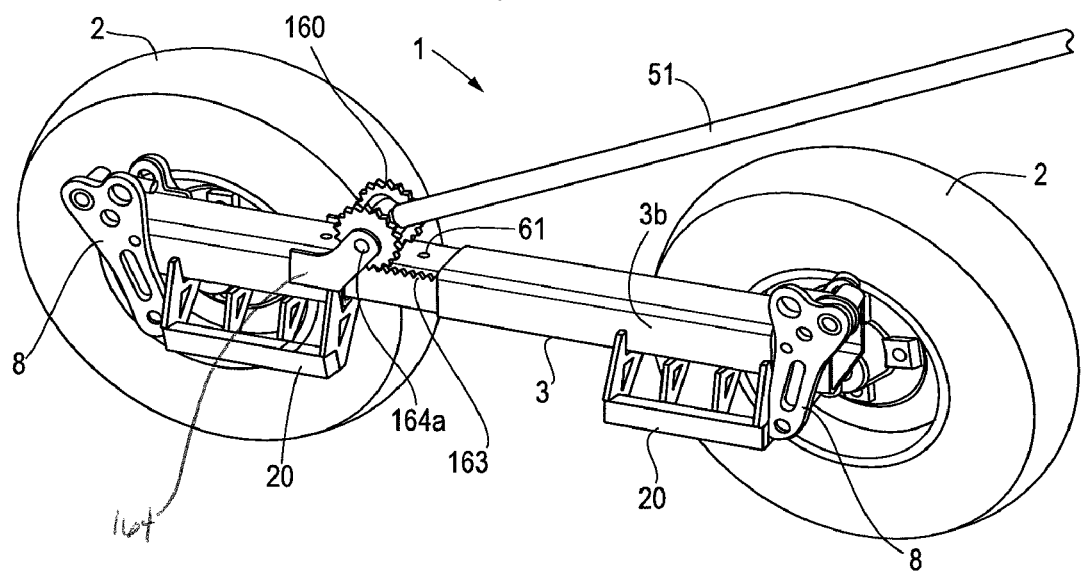
Figure 13:
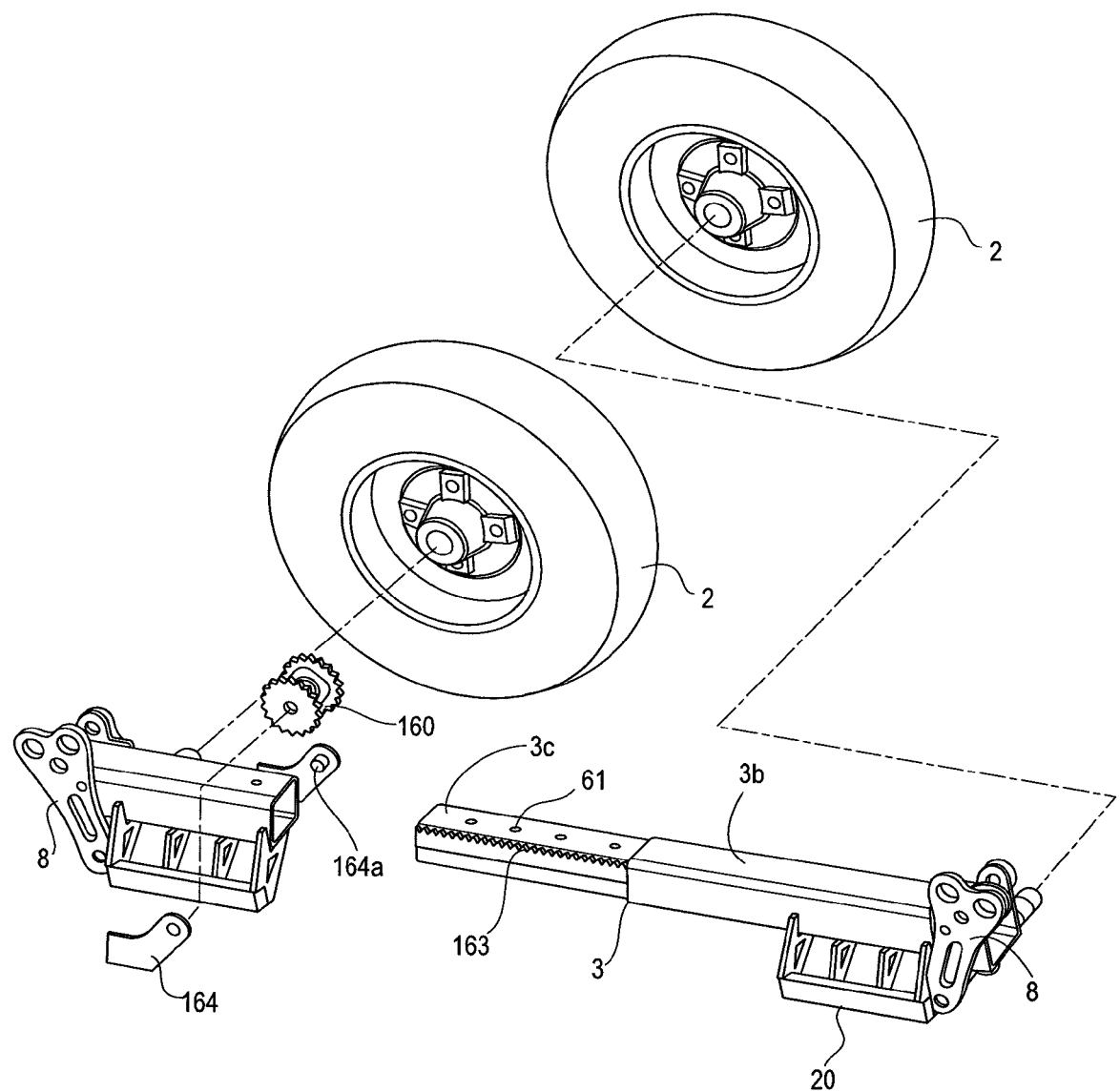
FIG. 13 is an exploded view of the inner side of the dolly wheel assembly of FIG. 12.

Referring now to FIGS. 12-13, a force leveraging mechanism in the form of a rack and pinion mechanism is shown for expanding or contracting main tube 3. In this alternative embodiment, toothed pinion wheel 160 intermeshes with toothed rack 163 of main tube 3. Pinion wheel 160 is rotatably secured to the main tube via opposing plates 164 and pin 164a. Using this mechanism, and similar to the operation described above with respect to the ratchet mechanisms, when bar 51 is rotated left to right, pinion wheel 160 will be rotated in a clockwise direction, causing the left side of main tube 3 to be moved to the right as the pinion wheel teeth mesh with the rack teeth. A stop mechanism similar to the one described above may be employed with this mechanism, as well, if desirable.

Referring now to FIGS. 7-13, an advantage to the sliding main bar 3 is that the leverage provided allows the user the ability to squeeze a flat tire (not shown) within cross-axles 7a before the towing dolly assembly 1 is loaded and raised.

Figure 15:
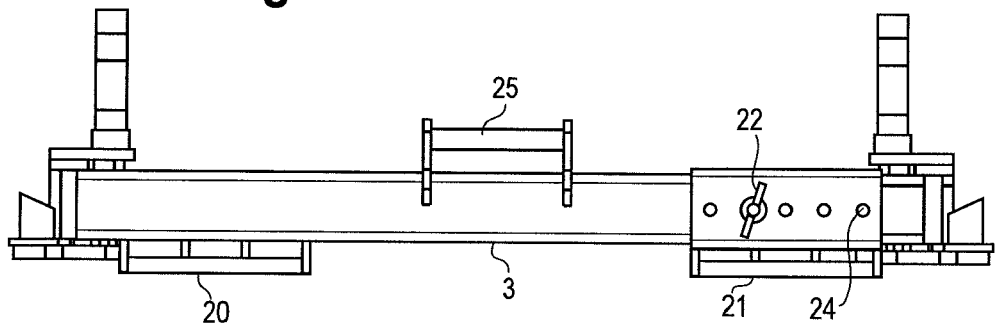
FIG. 15 is a top view of the main bar of a dolly wheel assembly.
Figure 15A:
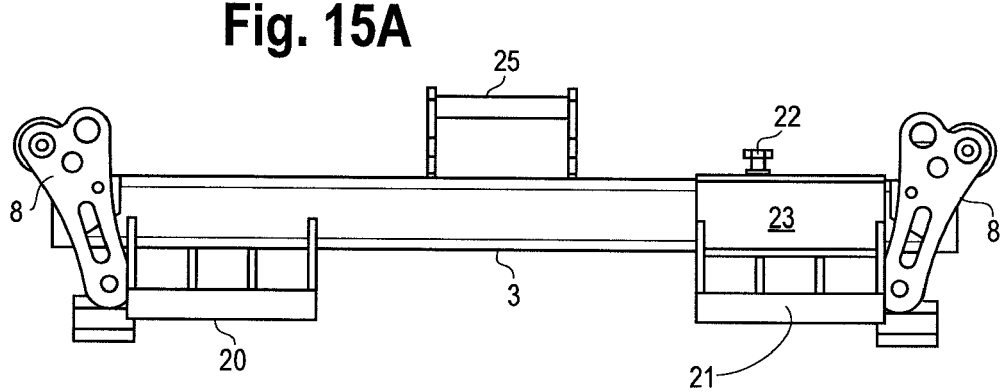
FIG. 15A is a front view of the inner side of the main bar of a dolly wheel assembly.
Figure 15B:
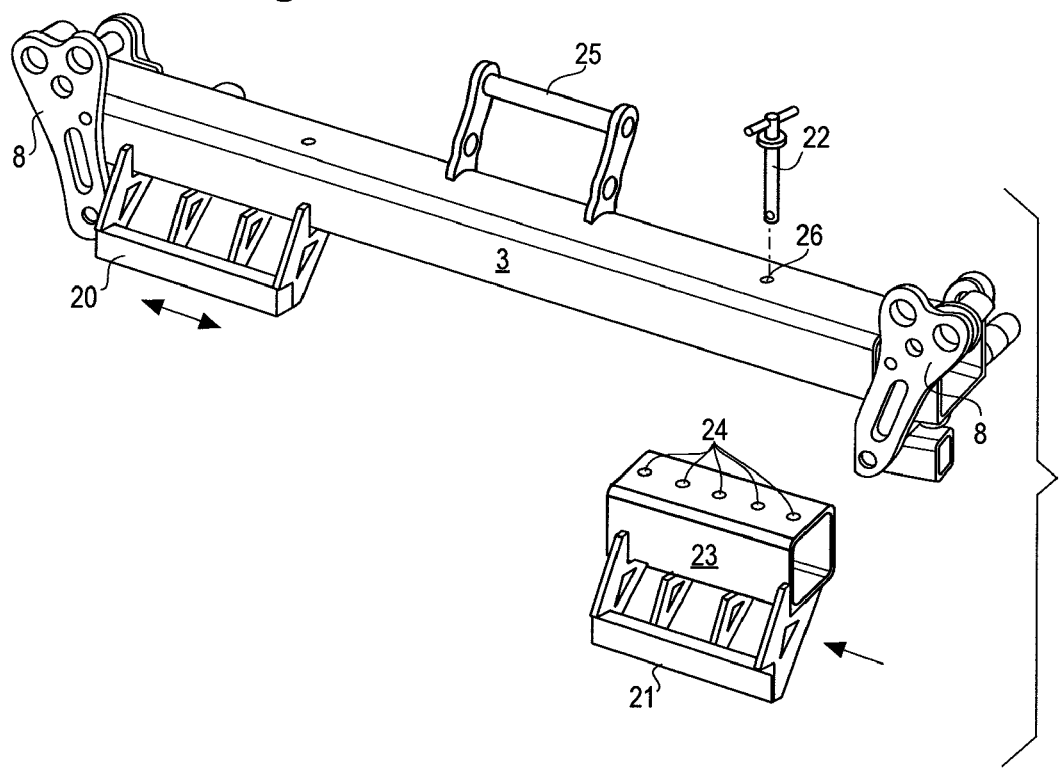
FIG. 15B is a top and side view of the inner side of the main bar of a dolly wheel assembly.

In another preferred embodiment, referring now to FIGS. 14-15B, main tube 3 may have one or more axle cradle assemblies 20, 21 adapted to attach to an axle connecting two opposing dolly assemblies. Preferably, one cradle 21 may be slidable along main bar 3. This slidable cradle 21 allows a user to more easily position the dolly assembly around the wheel of disabled vehicle as the user is not limited by where the axle is located. Cradle 21 slides over main tube 3 via connector 23 that encircles main tube 3. Cradle tube 23 may contain apertures 24. Spring-loaded apertures 22 align with apertures 26 (FIG. 15) located on main bar 3. Pin 22 inserted through both pinholes 24, 26 and this will lock cradle 21 in place.

Figure 16:
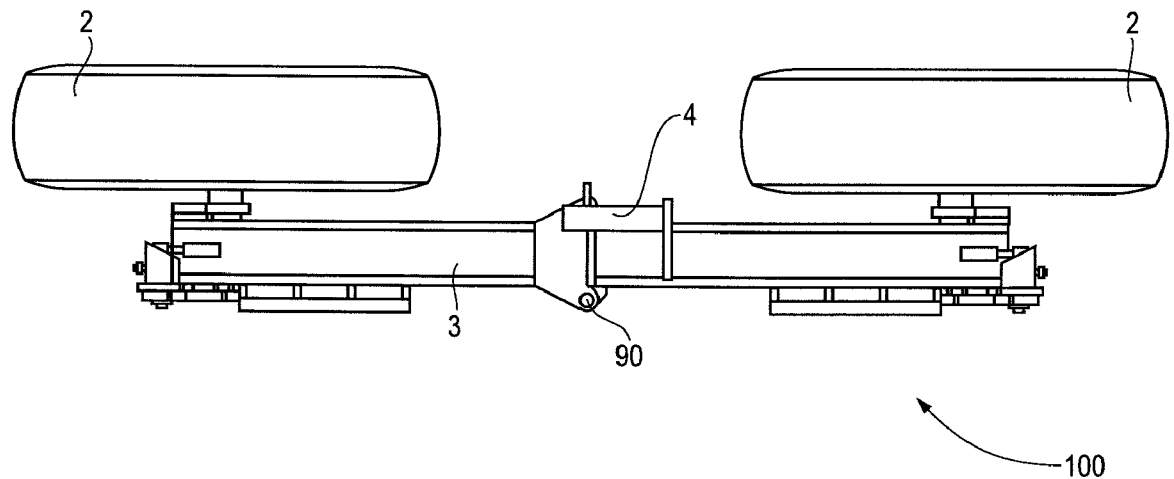
FIGS. 16 and 16A are a top view of a dolly wheel assembly.
Figure 16A:
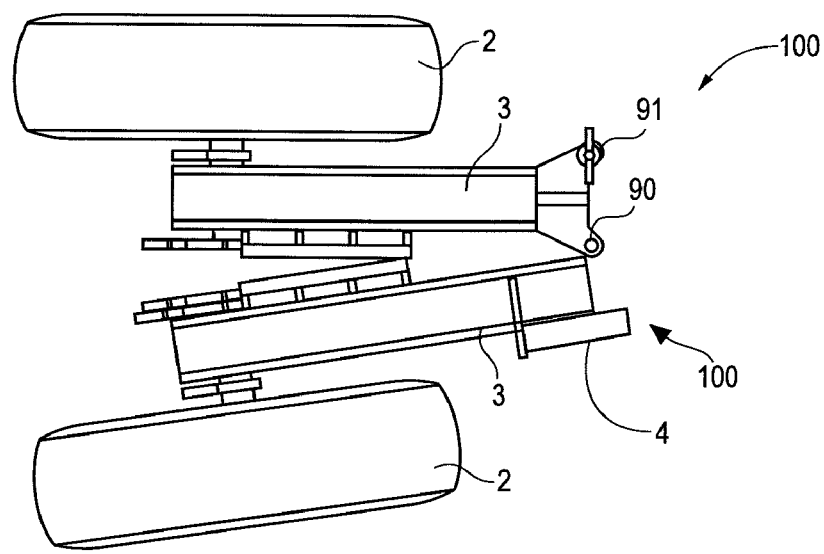
Figure 17:
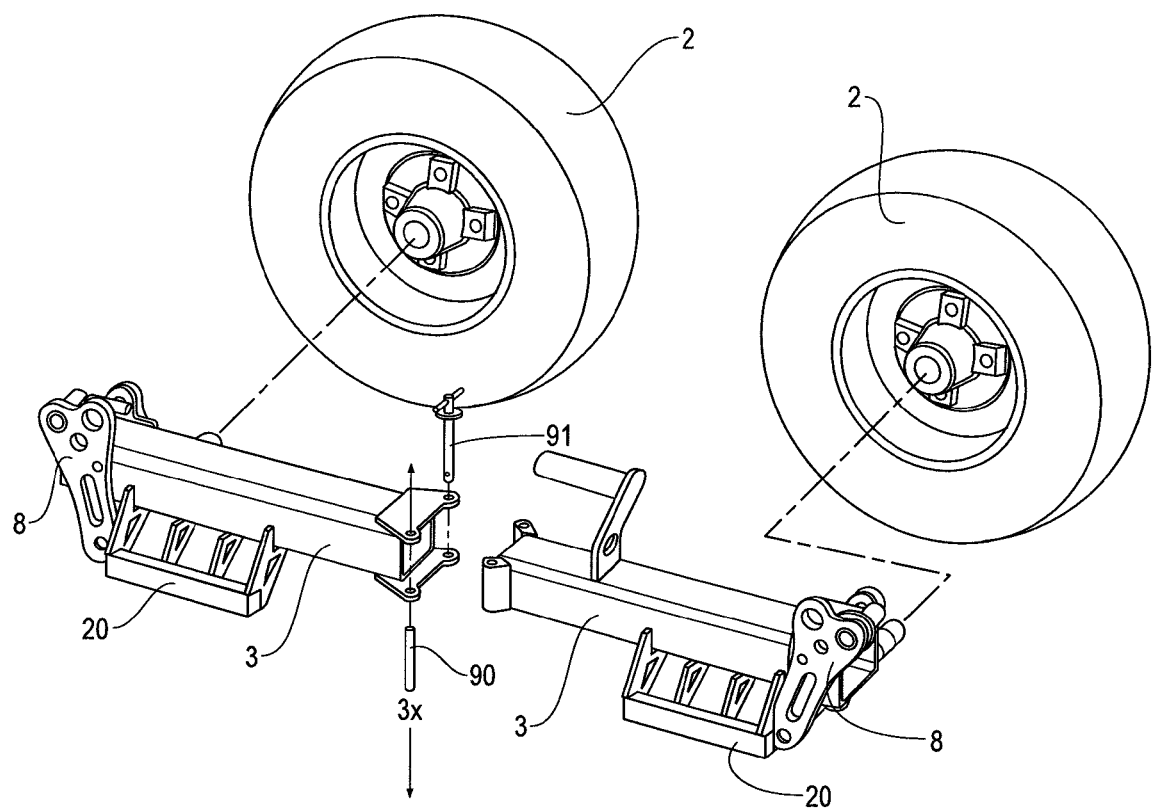
FIG. 17 is an exploded top and side perspective view of the inner side of the dolly wheel assembly in FIG. 16.

Referring now to FIGS. 16-17, a collapsible towing dolly assembly 100 is shown with main tube 3 having a dolly wheel 2 mounted on each end; main tube 3 is collapsible by pivoting about vertical axis 3x (FIG. 17) using rotation pin 90 preferably located at an approximate midpoint. To collapse the dolly assembly, the user removes pin 91, thereby unlocking one side of the main tube from a fixed, planar position (as seen in FIG. 16), allowing the user to collapse main tube 3 inward along axis 3x (FIG. 16A).

In an embodiment not shown, a collapsible towing dolly assembly with main tube may be collapsible by pivoting about a horizontal axis using a rotation pin preferably located at an approximate midpoint. To collapse the dolly, the user removes the rotation pin, thereby unlocking one side of the main tube from a fixed, planar position, allowing the user to collapse the main tube upward or downward along the horizontal axis of main tube.

The above description is not intended to limit the meaning of the words used in the following claims that define the invention. For example, while preferred embodiments involving towing dolly assemblies have been described above, persons of ordinary sill in the art will understand that a variety of other designs still falling within the scope of the following claims may be envisioned and used. It is contemplated that future modifications in structure, function, or result will exist that are not substantial changes and that all such insubstantial changes in what is claimed are intended to be covered by the claims.

We claim:

1. A towing dolly cradle assembly for use in towing a disabled vehicle, comprising:
    two opposed, generally parallel pairs of dolly assemblies, each dolly assembly comprising a main tube having a dolly wheel mounted at each end;
    two opposed dolly axles connecting the opposed dolly assemblies, each dolly assembly being designed to grip and lift a tire of the disabled vehicle;
    wherein the main tube is capable of selective expansion or contraction along its longitudinal axis, to facilitate adjustment and placement of the dolly axles relative to the tire of the disabled vehicle.

2. A towing dolly cradle assembly for use in towing a disabled vehicle, comprising:
    two opposed, generally parallel pairs of dolly assemblies, each dolly assembly comprising a main tube having a dolly wheel mounted at each end;
    two opposed dolly axles connecting the opposed dolly assemblies, each dolly assembly being designed to grip and lift a tire of the disabled vehicle;
        wherein the main tube has one or more cradles mounted on it, the one or more cradles each being adapted to attach to a dolly axle;
        wherein the one or more cradles are capable of selective sliding movement along the main tube.

3. The dolly assembly of claim 2, further comprising two pivot mounting assemblies located at opposing locations on the main tube, each pivot mounting assembly being pivotably mounted to a dolly wheel.

4. The dolly assembly of claim 3, wherein the one or more cradles are located on the main tube and between the pivot mounting assemblies.

5. A towing dolly cradle assembly, comprising:
    two opposed, generally parallel towing dolly assemblies, each dolly assembly comprising a main tube and two dolly wheels, wherein opposing pivot mounting assemblies are located at each end of the main tube, and two axle cradle assemblies are located along the main tube and between the pivot mounting assemblies, with each axle cradle assembly connecting a dolly assembly to a dolly wheel; and
    two dolly axle assemblies interposed between and connecting the two dolly assemblies;
    wherein each main tube is capable of selective expansion or contraction along its longitudinal axis.

6. The towing dolly cradle assembly of claim 5, wherein each main tube carries one or more cradles, the one or more cradles each being adapted to attach to an axle assembly connecting two opposing dolly assemblies, and wherein the one or more cradles are capable of selective sliding movement along the main tube.

* * * * *